United States Patent Office 3,428,576
Patented Feb. 18, 1969

3,428,576
MANUFACTURE OF POLYMERIC DIGUANIDES
John David Dickinson, Francis Samuel Fowkes, and Trevor James Rose, Blackley, Manchester, England, assignors to Imperial Chemical Industries Limited, London, England, a corporation of Great Britain
No Drawing. Filed Nov. 17, 1966, Ser. No. 595,005
Claims priority, application Great Britain, Nov. 26, 1965, 50,340/65
U.S. Cl. 260—2      18 Claims
Int. Cl. C08g 33/02; C07c 129/16

---

ABSTRACT OF THE DISCLOSURE

Manufacture of polymeric diguanides of the unit formula $$\left[-NH-\underset{\underset{NH}{\|}}{C}-NH-\underset{\underset{NH}{\|}}{C}-NH-R-\right]-$$

by reacting approximately equimolar proportions of a diamine or its inorganic acid salt with a diamine salt of dicyanimide, at least the initial part of the reaction being carried out in the presence of a hydroxylic liquid which is a solvent for the reactants. Alternatively, 2 equivalents of the diamine or its inorganic acid salt can be reacted with 1 equivalent of a salt of dicyanimide with a metal capable of being precipitated from the reaction mixture in the form of a compound insoluble therein.

---

This invention relates to a process for the manufacture of polymeric diguanides and their salts.

It has previously been proposed to manufacture polymeric diguanides by a process comprising reaction of a bis-dicyandiamide of the formula $$NC-NH-\underset{\underset{NH}{\|}}{C}-NH.X.NH-\underset{\underset{NH}{\|}}{C}-NH-CN$$

with a diamine of the formula $$H_2N-Y-NH_2$$

or with a salt of such a diamine, where X and Y are bridging groups such as polymethylene chains, optionally interrupted by oxygen or sulphur atoms and optionally incorporating saturated or unsaturated cyclic nuclei.

This process has certain disadvantages in operation. Thus it requires that the bis-dicyandiamide be prepared and isolated in a preliminary stage; furthermore, in order to effect the reaction between the bis-dicyandiamide and the diamine or diamine salt, it is necessary to fuse the two ingredients together at a temperature in the range 100–170° C.; to assist the fusion process and the reaction, the ingredients must be reduced to a finely-powdered condition and blended in the dry state before heat is applied to the mixture; these are troublesome operations in large-scale manufacture. Alternatively, the two ingredients may, after powdering and blending, be heated together in the presence of an inert solvent of high boiling-point, but this is equally inconvenient in practice.

It has now been found that the disadvantages attendant on this process for manufacturing polymeric diguanides may be avoided by utilising a process in which a diamine, or an inorganic acid salt of a diamine, is reacted with a diamine salt of dicyanimide, at least the initial part of the reaction being carried out in the presence of a hydroxylic liquid which is a solvent for the said reactants.

Thus according to the present invention there is provided a process for the manufacture of polymeric diguanides which comprises reacting a diamine of the formula $H_2N-A-NH_2$, wherein A is as hereinafter defined, or an inorganic acid salt of such a diamine, with a diamine salt of dicyanimide having the formula $$[H_3\overset{+}{N}-B-\overset{+}{N}H_3]\;[\overset{-}{N}(CN)_2]_2$$

wherein B is as hereinafter defined, at least the initial part of the reaction being carried out in the presence of a hydroxylic liquid which is a solvent for the said reactants.

In the above formulae for the diamine and the diamine salt of dicyanimide, A and B represent bridging groups which are difunctional organic radicals. The radicals represented by A and B may be aliphatic, cycloaliphatic, aromatic or heterocyclic difunctional radicals.

The process of the invention is of particular value for the manufacture of polymeric diguanides in the case where A and B represent bridging groups consisting of polymethylene chains, optionally interrupted by oxygen or sulphur atoms and optionally incorporating saturated or unsaturated cyclic nuclei, in which the total number of carbon atoms contained in A and B together which are directly interposed between adjacent nitrogen atoms of the diamine residues is greater than 9 and smaller than 17. In those cases where the radicals A and/or B incorporate a cyclic group or groups, the number of carbon atoms directly interposed between adjacent nitrogen atoms is calculated to include those carbon atoms contained in that segment of the cyclic group or groups which constitutes the shortest path between the nitrogen atoms.

Examples of difunctional radicals which may be represented by A and B include the radicals resulting from the removal of the $NH_2$ groups from trimethylene diamine, hexamethylene diamine, decamethylene diamine, bis-ω-aminopropyl ether, 4:4′-diaminodicyclohexylmethane, 1:4-di-(ω-aminopropoxy)benzene and N:N′-diisobutylaminohexamethylene diamine.

The radicals represented by A and B may, if desired, be the same, and a particularly preferred embodiment of the invention consists in the manufacture of polyhexamethylenediguanide by the reaction of hexamethylene diamine with the hexamethylene diamine salt of dicyanimide, at least the initial part of the reaction being carried out in the presence of a hydroxylic liquid which is a solvent for the said reactants, that is to say the process according to the above definition in which A and B both represent the radical $-(CH_2)_6-$.

The hydroxylic solvent in which at least the initial part of the reaction between the diamine of the formula $$H_2N-A-NH_2$$

and the diamine salt of dicyanimide having the formula $$[H_3\overset{+}{N}-B-\overset{+}{N}H_3]\;[\overset{-}{N}(CN)_2]_2$$

takes place is preferably water, but lower aliphatic alcohols such as methanol or butanol may be employed and also mixtures of water with such alcohols or mixtures of such alcohols with minor proportions of non-hydroxylic solvents such as toluene.

The process of the invention may conveniently be carried out by adding approximately 1 molecular proportion of the diamine of the formula $H_2N-A-NH_2$ directly to a solution in a hydroxylic solvent of 1 molecular proportion of the diamine salt of dicyanimide having the formula $$[H_3\overset{+}{N}-B-\overset{+}{N}H_3]\;[\overset{-}{N}(CN)_2]_2$$

The mixture is then preferably adjusted to a pH in the range 6 to 8 by addition of a suitable quantity of a mineral acid, such as hydrochloric acid, so as to convert the free diamine to the mineral acid salt. The solution is then heated at atmospheric pressure up to a temperature of about 100° C., so that at least part of the hydroxylic solvent present distils off. Thereafter, heating is continued until the mixture attains a temperature of from 120 to 170° C.; further hydroxylic solvent may be allowed to distil off from the mixture at this stage, or alternatively the mixture may be subjected to pressure so that the remaining solvent is retained. Finally, the mixture is heated at a temperature of from 120 to 170° C. for a period of between 1 and 8 hours. Water may then be added if desired, and the mixture allowed to cool; the aqueous solution of the polymeric diguanide so obtained may be separated from any water-immiscible solvent present. For many purposes, actual isolation of the polymeric diguanide from the aqueous solution is not necessary.

The diamine salt of dicyanimide which is used in the process of the invention may be obtained by reacting together the diamine having the formula $H_2N-B-NH_2$, or an inorganic acid salt thereof, with a metal salt of dicyanimide. The preparation in this way of the diamine salt of dicyanimide may conveniently be carried out in a hydroxylic solvent, in which case the solution of the diamine salt obtained may be used directly for manufacturing the polymeric diguanide. The diamine salt of dicyanimide so obtained will normally, that is to say in the absence of special precautions, be contaminated with certain inorganic cations derived from the metal present in the metal salt of dicyanimide used. Such contamination does not interfere directly with the carrying out of the process of the invention, but the presence of inorganic residues may have an adverse effect upon the solubility in water of the final product of the process, which in turn may hinder the exploitation of the antibacterial properties for which certain of the polymeric diguanides are valuable. In order to overcome this drawback, it may be desirable to submit the polymeric diguanide obtained to a purification process to remove the inorganic contamination. Thus, for example, in the case in which the diamine salt of dicyanimide is obtained by the interaction in aqueous solution of the diamine dihydrochloride and sodium dicyanimide, sodium chloride present in the polymeric diguanide subsequently manufactured from it may be removed by dissolving the product in methanol and then filtering.

Such a final purification step may, however, be avoided if the diamine salt of dicyanimide is prepared under conditions such that it is itself obtained free from contamination by inorganic cations. It has been found that this may conveniently be achieved by reacting in a hydroxylic solvent the diamine having the formula $H_2N-B-NH_2$, or an inorganic acid salt thereof, with a metal salt of dicyanimide, the metal present in the said metal salt and the reaction conditions used being so selected that the metal is precipitated from the reaction mixture in the form of a compound which is insoluble in the said mixture and may readily be removed therefrom by, for example, filtration.

Thus according to a further feature of the present invention there is provided a process for the manufacture of polymeric diguanides as hereinbefore defined, wherein the diamine salt of dicyanimide is brought into contact with the diamine in the form of a solution in the hydroxylic solvent, the said solution having been obtained by the reaction together in that solvent of a diamine having the formula $H_2N-B-NH_2$, or an inorganic acid salt thereof, and a salt of dicyanimide with a metal capable of being precipitated from the reaction mixture in the form of a compound insoluble therein, the reaction being conducted under conditions such that the metal is removed from the reaction mixture in the form of the said insoluble compound.

One method of preparing the diamine salt of dicyanimide consists in reacting the free diamine in aqueous solution with a metal salt of dicyanimide the metal of which forms a water-insoluble hydroxide; the hydroxide is precipitated during the reaction and may be removed by filtration. An example of a metal salt of dicyanimide which may be used in this method is zinc dicyanimide.

Another method of preparing the diamine salt of dicyanimide comprises carrying out a double decomposition reaction in a hydroxylic solvent between an inorganic acid salt of the diamine and a metal salt of dicyanimide selected so that the salt formed by combination of the metal cation with the inorganic acid anion can be removed by precipitation and filtration. The reactants may be chosen so that the inorganic metal salt formed is one which is insoluble in the hydroxylic solvent in which the reaction is carried out and which consequently precipitates spontaneously, or they may be chosen so that the inorganic metal salt, although soluble in the reaction medium, may be precipitated therefrom by the addition of a suitable miscible solvent after the reaction is complete. Thus for example, the diamine carbonate may be reacted in aqueous solution with the zinc salt of dicyanimide, whereby zinc carbonate is precipitated and the diamine salt of dicyanimide passes into solution; alternatively the free diamine may be reacted with the zinc salt of dicyanimide while a stream of carbon dioxide is passed into the mixture, whereby the diamine carbonate is formed in situ. Instead of the zinc salt of dicyanimide, the copper or calcium salt thereof may be employed. As a further example, the diamine hydrochloride may be reacted in aqueous solution with the sodium salt of dicyanimide and the sodium chloride formed then precipitated by addition of methanol and filtered off, to give an aqueous alcoholic solution of the diamine salt of dicyanimide.

The formation of the diamine salt of dicyanimide may be assisted by carrying out the reaction between the diamine, or the inorganic acid salt thereof, and the metal salt of dicyanimide at a moderately elevated temperature, for example at about 30 to 70° C. If, after the precipitated metal compound has been removed by filtration of the reaction mixture, the filter residue is washed with further solvent and the washings are combined with the filtrate it is possible to obtain a substantially theoretical yield of the diamine salt based on the metal salt taken.

The proportions of the diamine, or inorganic acid salt thereof, and the metal salt of dicyanimide which are reacted together will normally be approximately those proportions which correspond with the product formula

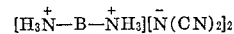

that is to say approximately 1 equivalent (in terms of amine groups) of the diamine and 1 equivalent (in terms of dicyanimide groups) of the metal salt. However, in the particular case in which the process of the invention is being utilised to manufacture a polymeric diguanide in which the radicals A and B as hereinbefore defined are the same, in other words when the diamine present as a component of the diamine salt of dicyanimide and the diamine with which this salt is reacted are identical, it is possible to introduce all the diamine required in a single addition to the metal salt of dicyanimide and carry out the formation of the diamine salt and of the polymeric diguanide in a single stage. Under these circumstances, the proportions of the reactants used will be approximately 2 equivalents of the diamine, or inorganic acid salt thereof, and 1 equivalent of the metal salt, and the diamine salt of dicyanimide then obtained will be that having the formula

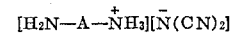

or an inorganic acid salt thereof. On heating this salt under the conditions previously described for the case where A and B are different, the polymeric diguanide is formed directly.

Thus according to a still further feature of the present invention there is provided a process for the manufacture of polymeric diguanides which comprise reacting together in a hydroxylic solvent 2 equivalents of a diamine of the formula $H_2N-A-NH_2$, wherein A is as hereinbefore defined, or an inorganic acid salt of such a diamine, and 1 equivalent of a salt of dicyanimide with a metal capable of being precipitated from the reaction mixture in the form of a compound insoluble therein, the reaction being conducted under conditions such that the metal is removed from the reaction mixture in the form of the said insoluble compound.

In carrying this further aspect of the invention into effect, the metal salts of dicyanimide and the reaction conditions employed may be the same as those already described for the case where the formation of the diamine salt and of the polymeric diguanide occur in separate stages. The removal by filtration or other means of the metal compound insoluble in the reaction mixture may be effected either before the period of heating at from 120° to 170° C. or after that operation, as desired.

The invention is illustrated but not limited by the following examples in which parts are by weight:

EXAMPLE 1

29.2 parts of hexamethylenediamine are dissolved in 200 parts of water and 49.4 parts of zinc dicyanimide are added to the solution. The mixture is heated to 60° C., the pH of the mixture at this stage being about 11. Carbon dioxide gas is passed through the mixture until the pH is 6.8–7. The mixture is cooled, filtered and the insoluble residue washed with water to extract the optimum amount of the hexamethylenediamine salt of dicyanimide, which is obtained in substantially quantitative yield from the zinc dicyanimide used. 29.0 parts of hexamethylenediamine are added to the mixture of filtrates and washes and about 50.7 parts of 36% aqueous hydrochloric acid are added until the solution is at pH 6.8–7. The solution is then distilled at atmospheric pressure to remove water until the temperature of the mixture is 150–155° C. It is then stirred at 150–155° C. for 4 hours. The product is obtained as an aqueous solution containing 107 parts of polyhexamethylenediguanide hydrochloride by adding water to the reaction mixture and cooling.

EXAMPLE 2

29 parts of hexamethylenediamine are dissolved in 200 parts water and 48 parts of zinc dicyanimide are added. The mixture is heated to 60° C. and held for 30 minutes at that temperature. The mixture is cooled to 25° C., filtered and the insoluble residues are washed with cold water to remove all soluble products. The combined filtrate and washes contain 20 parts of the hexamethylenediamine salt of dicyanimide. To this aqueous solution are added 9.3 parts of hexamethylenediamine and approximately 16.3 parts of 36% hydrochloric acid so as to give a final solution between pH 6.8–7. The solution is heated to remove water until the temperature of the mixture is 150–155° C. and it is held for 4 hours at this temperature. Water is then added to the reaction mixture to give an aqueous solution containing approximately 41.5 parts of polyhexamethylenediguanide hydrochloride.

EXAMPLE 3

89 parts of sodium dicyanimide and 116 parts of hexamethylenediamine are mixed with 73 parts of water. Approximately 190 parts of 36% hydrochloric acid are added so that the final solution is at pH 6.5–7.5. The solution is heated to remove water until the temperature of the mixture remaining is 120° C., the reaction vessel is sealed and the contents heated to 150° C. at approximately 30 lb./sq. in. pressure. The mixture is held at this temperature for 4½ hours, then cooled to 120° C. 500 parts of methanol are added to the mixture to dissolve the polymeric diguanide formed and the mixture is filtered to remove sodium chloride. The filtrate is heated at atmospheric pressure to remove methanol and water is added to give an aqueous solution containing 142 parts of polyhexamethylenediguanide hydrochloride.

EXAMPLE 4

116 parts of hexamethylenediamine are added to a mixture of 380 parts of isobutanol and 67 parts of toluene. The diamine is neutralised by the addition of about 200 parts of 36% hydrochloric acid, and water is then removed from the mixture by azeotropic distillation, the upper solvent layer of the distillate being returned to the mixture. 98 parts of sodium dicyanimide are added and the mixture is refluxed for 8 hours. The reaction vessel is then sealed and heated to 120–125° C. (pressure about 14 p.s.i.) and held at 122±2° C. for 7 hours. After cooling, water is added with stirring and the brine formed by extraction of the by-product sodium chloride allowed to settle. The brine is separated and more water is added to the reaction mixture in order to dissolve the polymeric diguanide, the resulting aqueous solution being then separated from the upper layer of isobutanol/toluene. The aqueous solution obtained contains about 160 parts of polyhexamethylenediguanide hydrochloride.

EXAMPLE 5

15.5 parts of hexamethylenediamine are dissolved in 80 parts of water and carbon dioxide gas is passed into the solution until the pH is 8.8–9.0. A solution of 23 parts of calcium dicyanimide in 80 parts of water is added and the combined mixture is heated to 60° C. The mixture is cooled, filtered and the insoluble residue of calcium carbonate is washed with water to extract the optimum amount of the hexamethylenediamine salt of dicyanimide, which is obtained in substantially quantitative yield from the calcium dicyanimide used. 15.3 parts of hexamethylenediamine are added to the mixture of filtrates and washes, and about 26.7 parts of 36% aqueous hydrochloric acid are added until the solution is at pH 6.8–7. The solution is then distilled at atmospheric pressure to remove water until the temperature of the mixture is 150–155° C. It is then stirred at 150–155° C. for 4 hours. The product is obtained as an aqueous solution containing 56.5 parts of polyhexamethylenediguanide hydrochloride by adding water to the reaction mixture and cooling.

EXAMPLE 6

19.3 parts of hexamethylenediamine are dissolved in 133 parts of water and 32 parts of copper dicyanimide are added. The mixture is heated to 65° C. and carbon dioxide gas is passed through the mixture for 1 hour so that the pH remains at 7–8 during the reaction. The mixture is cooled, filtered and the insoluble residue washed with water to extract the optimum amount of the hexamethylenediamine salt of dicyanimide, which is obtained in about 90% yield from the copper dicyanimide used. A quantity of hexamethylenediamine equivalent to the amount of hexamethylene-diamine salt produced is added and conversion of the mixture to polyhexamethylene diguanide hydrochloride is then carried out essentially as described in Example 1.

EXAMPLE 7

Carbon dioxide gas is passed into a mixture of 18 parts of decamethylenediamine and 150 parts of water until the pH of the mixture is 7.5. The mixture is heated to 60° C. and 20 parts of zinc dicyanimide are added. The mixture is cooled, filtered and the insoluble residue is washed with water to extract the optimum amount of the decamethylenediamine salt of dicyanimide which is obtained in about 87% yield from the zinc dicyanimide used. 10.5 parts of hexamethylenediamine are added to the mixture of filtrates and washes and about 19 parts of 36% aqueous hydrochloric acid are added until the solution is at pH 6.8–7. The solution is then distilled at atmospheric pressure to remove water until the temperature of the mixture is 150–155° C. It is then held at 150–155° C. for 4 hours. The product is obtained as an aqueous solution of polymeric diguanide salt by adding water to the reaction mixture and cooling. It gives an insoluble mauve-pink copper derivative.

We claim:

1. A process for the manufacture of polymeric diguanides which comprises reacting approximately 1 molecular proportion of a compound selected from diamines of the formula H₂N—A—NH₂ and inorganic acid salts thereof with 1 molecular proportion of a diamine salt of dicyanimide having the formula

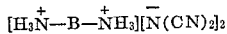

wherein A and B represent difunctional radicals selected from aliphatic, cycloaliphatic, aromatic and heterocyclic difunctional radicals, at least the initial part of the reaction being carried out in the presence of a hydroxylic liquid which is a solvent for the said reactants.

2. A process as claimed in claim 1, wherein A and B represent polymethylene radicals.

3. A process as claimed in claim 2, wherein A and B represent the same polymethylene radical.

4. A process as claimed in claim 3, wherein the polymethylene radical is the hexamethylene radical, —(CH₂)₆—.

5. A process as claimed in claim 1, wherein the hydroxylic solvent is water.

6. A process as claimed in claim 1, wherein the hydroxylic solvent is selected from lower aliphatic alcohols and their mixtures with water.

7. A process as claimed in claim 1, wherein the reaction between the diamine of the formula H₂N—A—NH₂ and the diamine salt of dicyanimide of the formula

is wholly carried out in the presence of the hydroxylic solvent.

8. A process as claimed in claim 1, wherein the reaction is brought about by adding to the mixture of the diamine, the diamine salt of dicyanimide and the hydroxylic solvent sufficient of a mineral acid to bring the pH of the mixture to a value in the range 6–10 and thereafter heating at a temperature of from 120° to 170° C. for a period of from 1 to 8 hours.

9. A process as claimed in claim 1, wherein the diamine salt of dicyanimide is brought into contact with the diamine in the form of a solution in the hydroxylic solvent, the said solution having been obtained by the reaction together in that solvent of a compound selected from diamines of the formula H₂N—B—NH₂ and inorganic acid salts thereof and a salt of dicyanimide with a metal capable of being precipitated from the reaction mixture in the form of a compound insoluble therein, the reaction being conducted under conditions such that the metal is removed from the reaction mixture in the form of the said insoluble compound.

10. A process as claimed in claim 9, wherein the diamine salt of dicyanimide is obtained in the form of an aqueous solution by reacting the free diamine in water with a metal salt of dicyanimide the metal of which forms a water-insoluble hydroxide.

11. A process as claimed in claim 9, wherein the diamine salt of dicyanimide is obtained in the form of an aqueous solution by passing carbon dioxide into an aqueous solution of the diamine in the presence of a metal salt of dicyanimide the metal of which forms a water-insoluble carbonate.

12. A process as claimed in claim 9, wherein the metal salt of dicyanimide is the zinc salt thereof.

13. A process as claimed in claim 9, wherein the metal salt of dicyanimide is the copper or calcium salt thereof.

14. A process as claimed in claim 9, wherein the formation of a diamine salt of dicyanimide having the formula

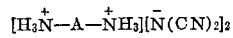

and the reaction of that salt with a compound selected from diamines of the formula [H₂N—A—NH₂] and inorganic acid salts thereof, in which A is as defined in claim 1, is carried out in a single stage, the process comprising reacting together in a hydroxylic solvent 2 equivalents of the said compound and 1 equivalent of a salt of dicyanimide with a metal capable of being precipitated from the reaction mixture in the form of a compound insoluble therein, the reaction being conducted under conditions such that the metal is removed from the reaction mixture in the form of the said insoluble compound.

15. A process as claimed in claim 14, wherein the reaction is brought about by adding to the mixture of the diamine, the metal salt of dicyanimide and the hydroxylic solvent sufficient of a mineral acid to bring the pH of the mixture to a value in the range 6–8 and thereafter heating at a temperature of from 120° to 170° C. for a period of from 1 to 8 hours.

16. A process as claimed in claim 15, wherein the metal compound insoluble in the reaction mixture is removed therefrom after the heating step has been carried out.

17. A process as claimed in claim 15, wherein A represents the hexamethylene radical, —(CH₂)₆—.

18. A process as claimed in claim 15, wherein the metal salt of dicyanimide is the sodium salt thereof.

References Cited

UNITED STATES PATENTS 2,325,586 8/1943 Bolton et al. _____ 260—2
2,643,232 6/1953 Rose et al. _____ 260—2

SAMUEL H. BLECH, *Primary Examiner.*

U.S. Cl. X.R.

260—47, 29.2, 429.9, 438.1, 551